United States Patent [19]

Pietsch

[11] 4,138,859

[45] Feb. 13, 1979

[54] SPLIT HEAT PUMP OUTDOOR FAN ARRANGEMENT

[75] Inventor: Joseph A. Pietsch, Tyler, Tex.

[73] Assignee: General Electric Company, Louisville, Ky.

[21] Appl. No.: 847,874

[22] Filed: Nov. 2, 1977

[51] Int. Cl.² ............... F25B 13/00; F25D 23/12; F25D 19/00

[52] U.S. Cl. .............................. 62/324; 62/298; 62/259

[58] Field of Search ......... 62/259, 298, 324, DIG. 16, 62/453, 452, 447

[56] References Cited

U.S. PATENT DOCUMENTS

| 1,942,295 | 1/1934 | Kerr, Jr. et al. | 62/324 |
|---|---|---|---|
| 2,525,869 | 10/1950 | Corhanidis | 62/298 |
| 2,654,227 | 10/1953 | Muffly | 62/324 |
| 2,894,375 | 7/1959 | Waterfill | 62/324 |
| 2,955,439 | 10/1960 | Pinter | 62/324 |
| 2,959,933 | 11/1960 | Burke | 62/324 |
| 2,978,881 | 4/1961 | Alsing | 62/324 |
| 3,785,434 | 1/1974 | Okuma et al. | 62/324 |
| 3,995,442 | 12/1976 | Cavezza | 62/259 |

*Primary Examiner*—Lloyd L. King
*Attorney, Agent, or Firm*—Frank P. Giacalone; Radford M. Reams

[57] ABSTRACT

A heat pump split system type air conditioner having an indoor and outdoor section, the outdoor section being compartmentalized to provide an insulated compartment containing the motor-compressor and fan motor so that heat from the fan motor and motor-compressor can be partially recovered and added to the circulating system refrigerant to increase the heating capacity of the heat pump.

4 Claims, 2 Drawing Figures

SPLIT HEAT PUMP OUTDOOR FAN ARRANGEMENT

BACKGROUND OF THE INVENTION

1. Field of the Invention

This invention relates to heat pump split system type air conditioners including an indoor section and an outdoor housing including an outdoor heat exchanger, fan motor, fan, motor-compressor, and associated refrigeration system components, and more particularly to a compartmentalized outdoor housing including a first compartment for containing the outdoor heat exchanger and fan for moving air therethrough and a second insulated compartment containing the fan motor and the refrigerant motor-compressor.

2. Description of the Prior Art

In many reverse cycle split heat pump refrigeration systems, the refrigerant motor-compressor is located in the outdoor unit so that heat from the motor-compressor case will not be transmitted to the indoor air being cooled during summer operation, and in fact heat from the compressor case is given up to the outdoor air circulated through the outdoor compartment and heat exchanger. This arrangement is disadvantageous in winter operation in that the heat from the compressor case is not utilized during the winter.

With reference to U.S. Pat. No. 2,978,881, the motor-compressor shell which houses the compressor and its motor is insulated along with portions of the discharge line. With the unit operating in the heating mode, this arrangement retains most of the motor-compressor heat in the system during winter operation, with the result that this heat will ultimately be carried by the circulating refrigerant to the indoor coil and there be rejected.

Referring now to U.S. Pat. No. 2,959,933, an air conditioning unit is disclosed wherein the heat generated by the compressor, the motor driving the compressor, and the electrical components forming the control system for the unit is made available for incorporation into the system under certain operating conditions. The compressor is isolated from the outdoor heat exchanger by a partition including a damper. The damper remains closed when ambient temperatures are below a predetermined level so that radiant heat generated by the compressor and the motor driving the compressor is trapped in the insulated compressor compartment. Thus the system operates at a higher discharge temperature which in turn provides higher temperature refrigerant for liquification in the indoor heat exchanger operating as the system condenser in the heat mode.

SUMMARY OF THE INVENTION

The present invention relates to a split system air conditioner of the reversible heat pump type having indoor and outdoor sections. The indoor section includes a heat exchanger and a blower for moving indoor air through the indoor heat exchanger. The outdoor section includes a housing having an interior partition defining separate first and second compartments within the housing. The system motor-compressor and its associated system components is arranged in the first compartment together with the fan motor. The electric motor is arranged in the first compartment so that a portion of its drive shaft projects through the partition and into the second compartment. The outdoor heat exchanger is arranged in the second compartment and a fan mounted on the motor shaft portion extends into the second compartment for moving outdoor ambient air across the outdoor heat exchanger.

Substantially all of the walls of the first compartment are provided with a layer of insulating material that thermally isolates the second compartment from the first compartment and the ambient air. Most of the heat from the case of the motor-compressor, together with the heat generated by the fan motor, is therefore trapped in the insulated first compartment. Other than the small transmission losses through the insulated walls of the compartment, the only way heat can be removed from the compartment is through the refrigerant gases flowing through the piping within the compartment, with the result that this added or trapped heat will ultimately be carried by the refrigerant to the indoors and there be rejected to the indoor air by the indoor heat exchanger.

DETAILED DESCRIPTION OF THE INVENTION

Figure 1:
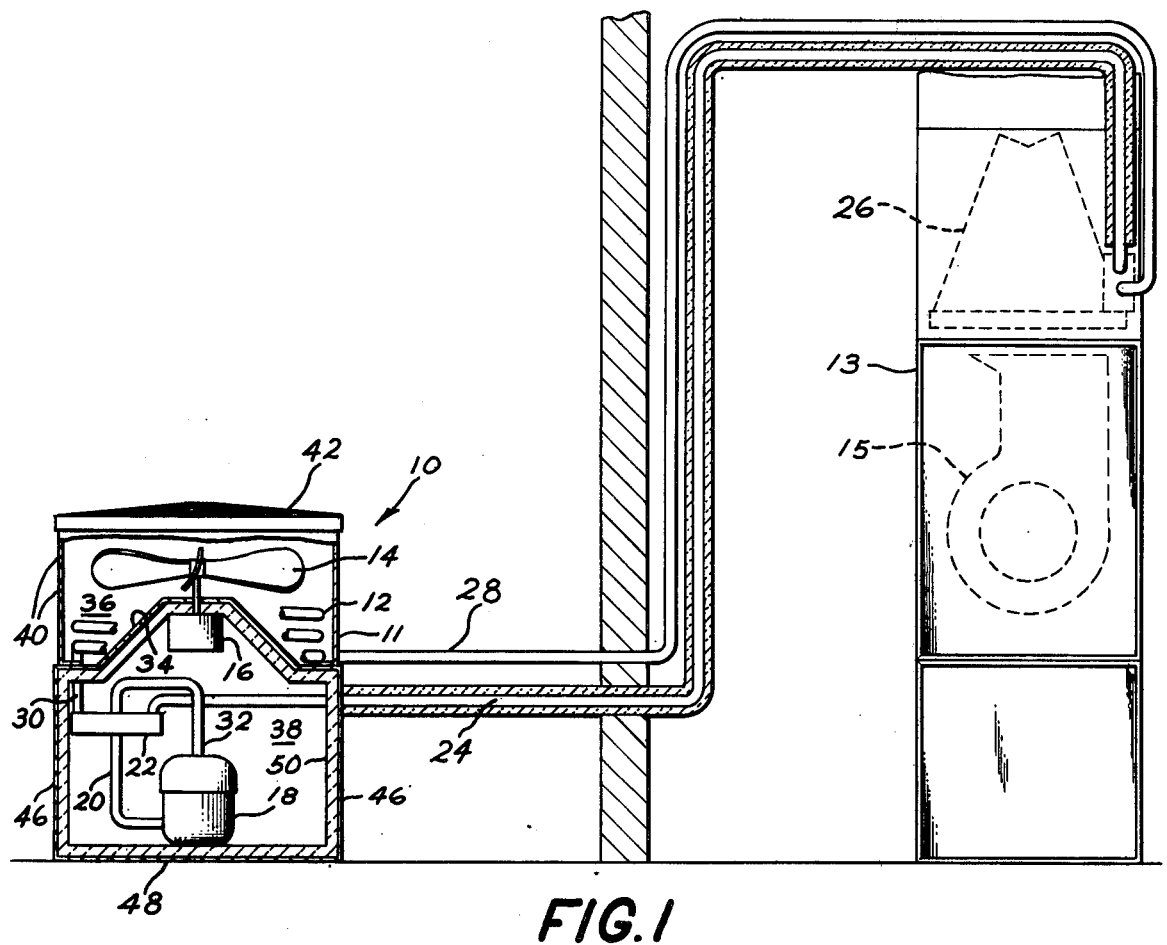
FIG. 1 is a schematic view of a split system heat pump showing the indoor section and the outdoor section incorporating the present invention.
Figure 2:
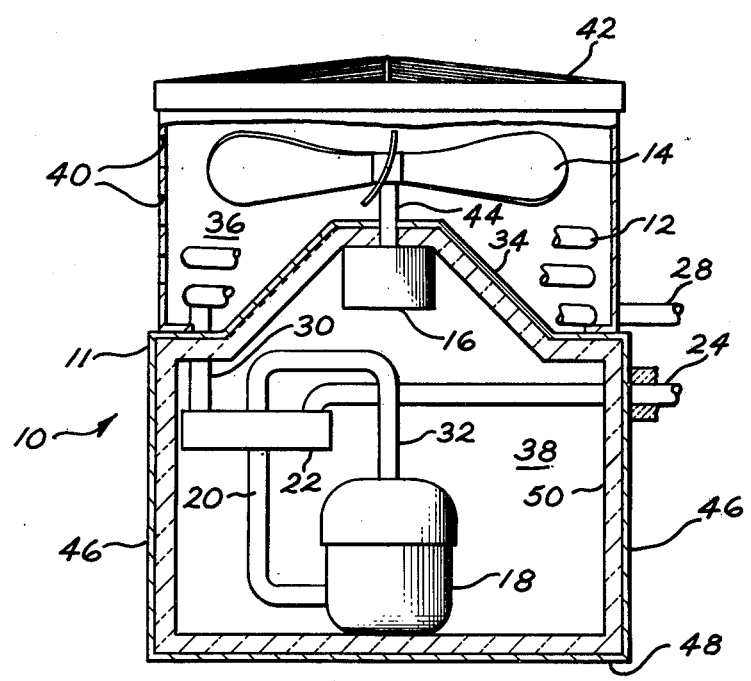
FIG. 2 is an enlarged elevational view of the outdoor section showing the arrangement of the present invention.

The outdoor unit 10 which incorporates the present invention includes a cabinet 11 housing an outdoor heat exchanger coil 12, a fan 14 driven by a motor 16, and the system motor-compressor 18. The outdoor compartment will hereinafter be described in detail in conjunction with the present invention.

The refrigeration system components in the outdoor unit comprise the motor-compressor 18, discharge line 20, reversing valve 22, and outside coil 12, which functions as an evaporator during the heating cycle. Fan 14 is employed to pass air in heat exchange relation with the coil 12. The refrigerant system components in the indoor unit comprise the indoor coil 26 and air handler 13 including blower 15 for passing air through heat exchanger 26.

In the heating cycle the hot gaseous refrigerant is discharged through line 20 from the motor-compressor 18, reversing valve 22, insulated line 24, to the indoor coil 26 where it is desuperheated and converted to the liquid phase as heat is extracted by the air moving through the heat exchanger 26. The liquid refrigerant then flows through line 28 to the outdoor coil 12 acting as the evaporator on the heating cycle, and is passed in heat exchange relation with a supply of air under influence of fan 14.

This latter heat exchange action causes the liquid refrigerant to vaporize and pass through line 30, reversing valve 22, and suction line 32 to motor-compressor 18, completing the cycle.

The refrigeration system when operating as a heating means for the enclosure requires that it function at low outdoor ambient temperatures. The cooling effect of the relatively cold ambient air on the refrigerant components, such as the motor-compressor 18, and suction line 32, causes the temperatures of hot discharge gas in line 20 to be lowered, and accordingly lower the heating output of the indoor coil operating as a condenser.

By the present invention means are provided to reduce heat loss in the outdoor section 10. Referring to the drawings, the cabinet 11 is provided with a partition or barrier 34 which defines separate compartments 36 and 38. Compartment 36 houses the outdoor heat exchanger coil 12 and fan 14. Air moving through the compartment 36 and coil 12 under influence of fan 14 enters openings 40 and exits through opening 42. It should be noted that partition 34 serves to isolate the compartments 36 and 38.

Compartment 38 houses the motor-compressor 18, reversing valve 22 including the suction lines 32 and discharge line 20. In accordance with the present invention, the fan motor 16 is also positioned in compartment 38 with its shaft 44 extending through the partition 34 into compartment 36 for mounting of fan 14. The side walls 46, bottom or base 48, together with the partition 34, form compartment 38 that is substantially isolated from the outside ambient. In order to essentially thermally isolate the compartment 38 from the influence of outdoor ambient temperature, the surfaces of walls 46, bottom 48, and partition 34 facing the inside of compartment 38 are provided with a substantial layer of thermal insulation 50. In effect, the compartment 38 provides an isolated thermally insulated housing for the components contained wherein most of the heat generated by the components may be recovered by the refrigerant gases circulating in the system and not lost to the outdoor ambient.

In operation, substantially all of the heat lost from the shell of the motor-compressor 18 is recovered by the refrigeration components and used efficiently to add heating output to the system.

To further enhance the efficient use of heat generated by the refrigeration components, as mentioned hereinbefore, the fan motor 16 is also arranged in compartment 38. It can easily be understood that any heat generated by the operating fan motor 16 is rejected to the air in the insulated compartment 38 and in turn is added to and absorbed by the refrigerant circulating through the components in the compartment 38.

In summary, by the present invention a heat pump system is provided wherein the outdoor fan motor 16, together with the motor-compressor and associated refrigeration components, is contained in an insulated compartment 38 so that heat generated by the operating fan motor 16 and by the motor-compressor shell is in fact added to the compartment ambient. Other than the small amount of heat that may be lost through the insulated walls the heat generated by the system components in compartment 38 is recovered and absorbed by refrigerant; some of the heat which heretofore had been lost or rejected to the outdoor air is used to increase the capacity and efficiency of the system.

Thus, instead of having the motor-compressor 18 and fan motor 16 cooled by the ambient air flowing through the outdoor compartment 38, the heat generated by their operation raises the temperature within the compartment and accordingly the components operate at a higher temperature. Retaining component heat in the compartment provides higher temperature refrigerant for removal of superheat and liquification in the coil 26 acting as the desuperheater and condenser and serving the inside of the enclosure being heated.

The foregoing is a description of the preferred embodiment of the invention and variations may be made thereto without departing from the true spirit of the invention, as defined by the appended claims.

What is claimed is:

1. A split refrigeration system air conditioner of the heat pump type including an indoor section having an indoor heat exchanger and air moving means for moving indoor air through said heat exchanger, and an outdoor section comprising:
    a housing;
    an interior partition means in said housing defining separate first and second compartments arranged within said housing;
    a motor-compressor means arranged in the first compartment;
    an electric motor in said first compartment having a rotatably arranged shaft having a portion extending through said partition means into said second compartment;
    an indoor heat exchanger in said second compartment being arranged between said ingress and egress openings;
    a fan mounted on said shaft portion in said second compartment for moving outdoor air through said heat exchanger;
    insulating means surrounding substantially the entire interior wall area of said first compartment so that said first compartment is essentially thermally isolated from said second compartment and the outdoor ambient temperature, and the heat generated by said motor and said motor-compressor is absorbed by refrigerant in said compressor and refrigeration system components in said first compartment.

2. The invention as set forth in claim 1 wherein a refrigeration system reversing valve including suction and discharge lines interconnecting said valve and said compressor is arranged in said first compartment.

3. The invention as set forth in claim 1 wherein said second compartment is arranged vertically above said first compartment.

4. The invention as set forth in claim 2 wherein said second compartment is arranged vertically above said first compartment.

* * * * *